United States Patent [19]
Walker et al.

[11] Patent Number: 5,525,975
[45] Date of Patent: Jun. 11, 1996

[54] SELF TELEMETRY FUZE TRANSMITTER

[75] Inventors: Thomas W. Walker; James D. Campbell, IV, both of Severn, Md.

[73] Assignee: The United States of America as represented by the Secretary of The Army, Washington, D.C.

[21] Appl. No.: 43,451

[22] Filed: Apr. 6, 1993

[51] Int. Cl.[6] .................................................. G01S 13/00
[52] U.S. Cl. ........................ 340/870.01; 342/50; 342/68
[58] Field of Search ..................... 340/870.01, 870.07; 342/50, 58, 68

[56] References Cited

U.S. PATENT DOCUMENTS

| | | | |
|---|---|---|---|
| 3,210,747 | 10/1965 | Clynes | 340/870.13 |
| 3,289,204 | 11/1966 | Murray et al. | 342/58 |
| 3,550,124 | 12/1970 | Heft et al. | 345/58 |
| 3,573,817 | 4/1971 | Akers | 340/539 |
| 4,005,420 | 1/1977 | McDonald | 343/7.5 |
| 4,144,815 | 3/1979 | Cumming et al. | 102/214 |
| 4,821,041 | 4/1989 | Evans | 343/745 |
| 5,156,357 | 10/1992 | Rollingson et al. | 244/3.14 |

OTHER PUBLICATIONS

"Very Low Cost Self Contained Fuze Telemetry," by Thomas W. Walker, 36th Annual Fuze Meeting, 7 Apr. 1992.

*Primary Examiner*—Brent A. Swarthout
*Assistant Examiner*—Daniel J. Wu
*Attorney, Agent, or Firm*—Freda L. Krosnick; Frank J. Dynda

[57] ABSTRACT

A self telemetry system for use on missiles that utilizes the existing on board fuze transmitter as a telemetry transmitter.

2 Claims, 4 Drawing Sheets

SELF TELEMETRY FUZE TRANSMITTER

RIGHTS OF THE GOVERNMENT

The invention described herein may be manufactured, used and licensed by or for the United States Government for Governmental purposes without payment to us of any royalty thereon.

BACKGROUND OF THE INVENTION

1. Field of the Invention

The present invention relates to telemetry systems on missiles and more specifically to telemetry systems which utilize existing on board fuze transmitters as the telemetry transmitter. This self telemetry fuze transmitter system is suitable for use in various categories of missiles, rockets, artillery, mortar, mines, torpedoes and submunitions.

2. Description of the Prior Art

Prior telemetry systems have been independent of the warhead fuze subsystem of missiles and by and large have been separate telemetry packages used in the research and development phase of missile development. These prior art telemetry packages have been heavy additions to the missile and have utilized substantial volume of the missile and therefore payload capacity. These separate telemetry packages have also required separate power supplies which added to the weight of the missile. These added packages in the past have therefore affected the physical performance properties of the missile. Add on telemetry systems can change the characteristics of the transmitting device such as weight, center of gravity, electrical noise, vibration, and dimensions.

Accordingly, it is an object of this invention to provide a self telemetry system which utilizes the existing radar system transmitter on missiles to convey information regarding the fuze operation and missile event status to a monitoring station.

It is another object of the invention to provide a self telemetry system that provides inflight diagnostic data.

Another object of the invention is to provide a self telemetry system that is transparent to the fuze operation.

It is another object of the invention to provide a self telemetry system that can be retained in the fuze production version for later use in lot acceptance tests, root cause tests, and type classification operations.

It is another object of the invention to provide a self telemetry system that can be used on any acoustic, electromagnetic, or optic transmitter device, mobile or fixed, to convey operational information for diagnostic or data purposes.

SUMMARY OF THE INVENTION

Briefly, the foregoing and other objects are achieved by a self telemetry system which utilizes the existing missile transmitter, whether electromagnetic, acoustic, or optic to send coded pulses which convey information regarding the missiles operation and/or status. The self telemetry system utilizes existing components on systems and therefore is inexpensive and non-invasive. It is valuable in the development and analysis of prototype fuze systems. Since self telemetry is self contained, it does not alter the system configuration or operation, and allows observation and evaluation of hardware in tactical situations.

In operation, an existing transmitter is modulated with coded pulses which represent specific events and conditions in the fuzes operation. These coded pulses are received and recorded by a platform based receiver for later or real-time evaluation.

As a selectable option, the self telemetry fuze transmitter can be programmed to turn on only when a fault condition occurs, and transmit the corresponding codes.

BRIEF DESCRIPTION OF THE DRAWINGS

A better understanding of the invention will be obtained when the following detailed description of the invention is considered in connection with the accompanying drawings in which.

DETAILED DESCRIPTION OF A SPECIFIC EMBODIMENT

The following description is of a specific embodiment of this invention.

Figure 1:
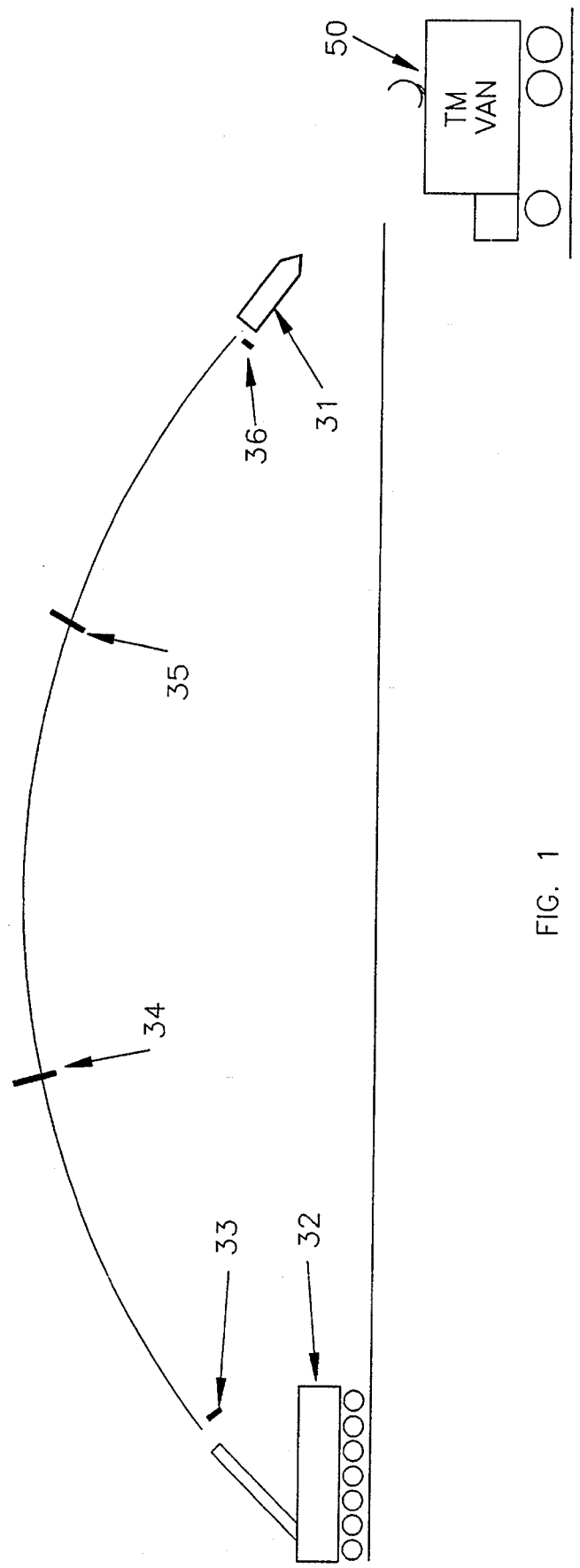
FIG. 1 shows a self telemetry system operation in a fuze ballistic environment.
Figure 2:
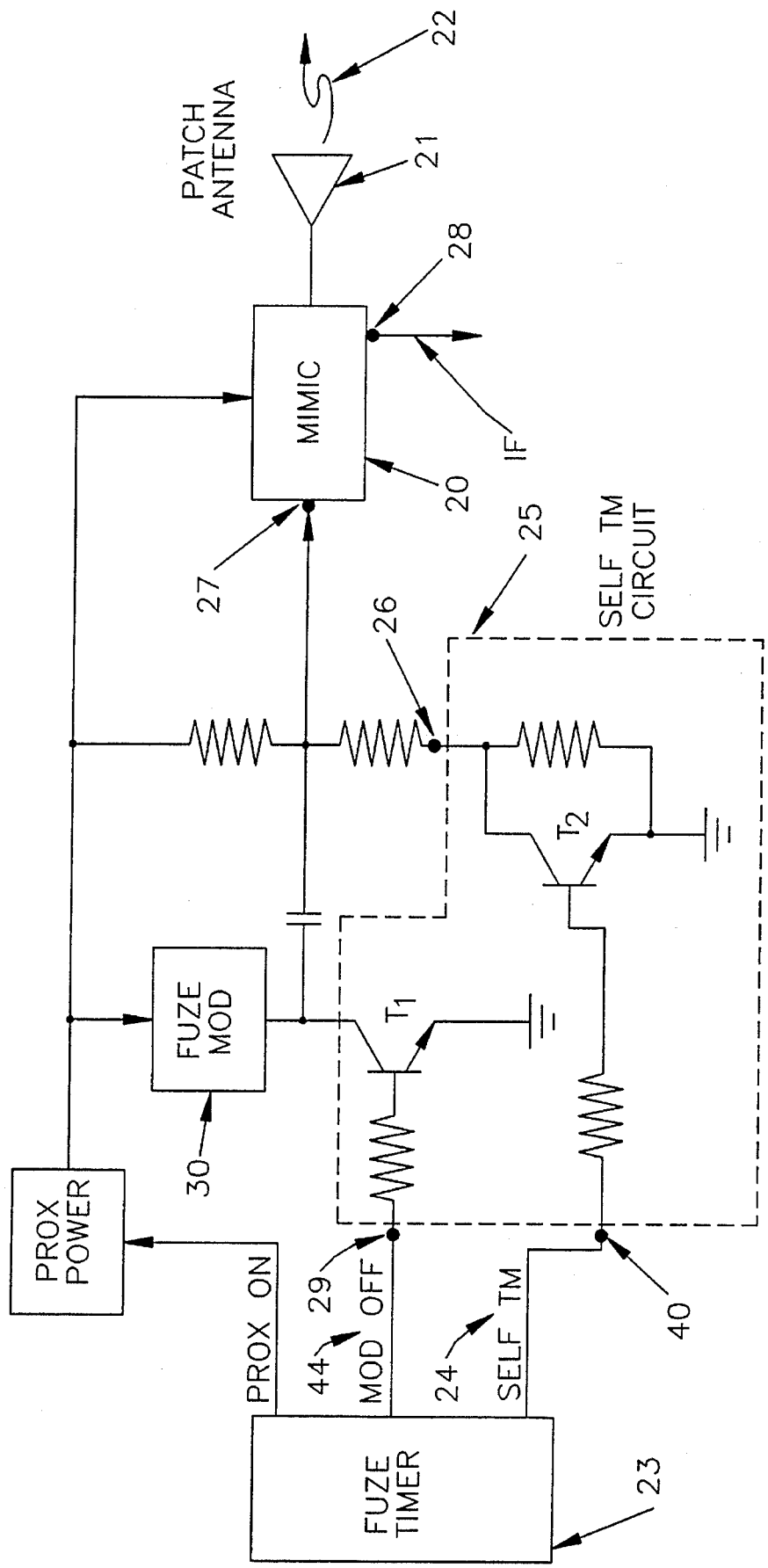
FIG. 2 shows a schematic for circuitry implementation.
Figure 3A:
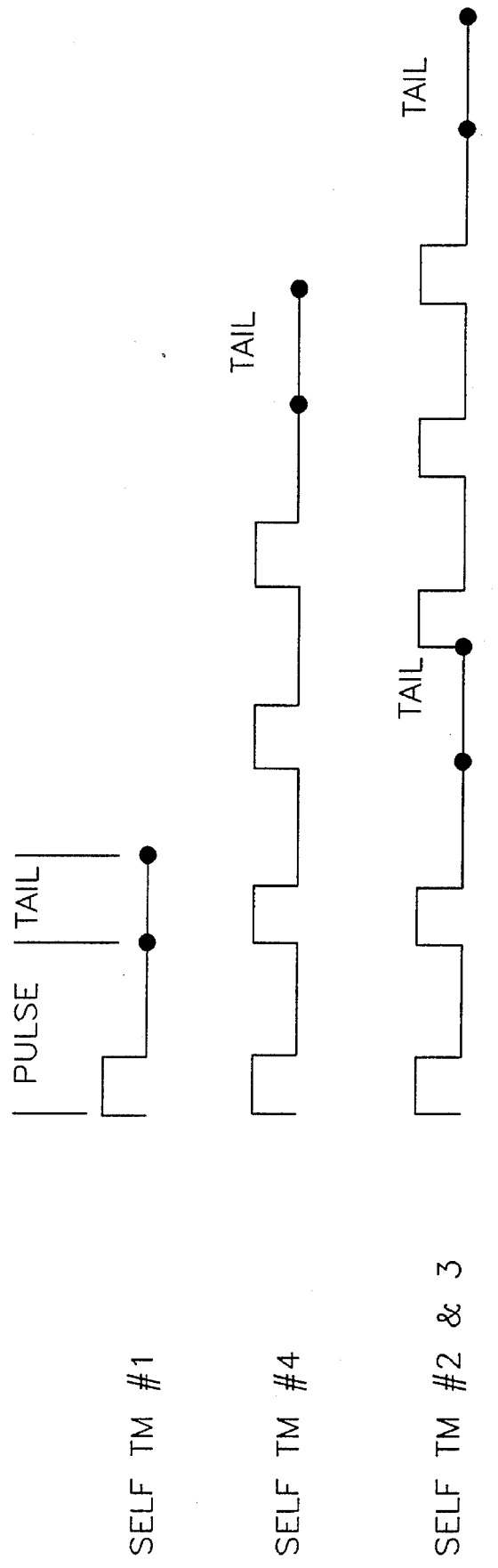
FIG. 3A and 3B show two typical pulse modulation schemes.

Refering to FIG. 2, a Monolithic Microwave Integrated Circuit (MMIC) 20 is used for the RF front end on the Multi-Option Fuze for Artillery (MOFA). The MMIC 20 is a complete transceiver and contains functions well known in the art for a transceiver. In this case the MMIC chip 20 contains a voltage controlled oscillator, a power amplifier, an active circulator, and a mixer. The MMIC 20 generates RF as a function of the voltage applied to the Voltage Controlled Oscillator (VCO) input 27 of the MMIC 20. In this embodiment the MMIC 20 is coupled to a patch antenna 21 which radiates the RF signal (22) generated in the MMIC 20. The fuze timer 23 sends a signal 24 containing the encoded fuze status to the self telemetry circuit 25 which in turn sends a modulation signal 26 to the MMIC 20 at the MMIC VCO input 27. The generation of encoded fuze status signals and event signals is made possible by the utilization of a microprocessor timer 23 and a software algorithm that outputs digital codes at specific events, sequences, and fault conditions in the fuzes operation. For example, during the fuze mission depicted in FIG. 1, the fuze timer 23 will generate the "proximity mode timer startup" self TM #4 code at t=0 seconds 33 by toggling the self TM input 40 of the self TM circuitry 25 shown on FIG. 2. This self TM #4 pulse train which is shown in FIG. 3A, varies the voltage at the modulation input 27 of the MIMIC 20 which varies the transmitted frequency 22. This transmitted signal 22 is received by the downrange TM van 50, shown in FIG. 1, where said signal 22 is recorded on magnetic tape for later playback.

The timer 23 will generate the "proximity mode electrical arm" self TM #3 pulse train at 22 seconds 34 in FIG. 1. This indicates that the detonator firing circuit is charged and enabled.

The timer 23 will generate the "proximity mode signal processor turn on" SELF TM #2 code 35, shown in FIGS. 1 and 3A, at 54 seconds into the mission. The timer 23 will generate the "proximity mode detonator fire" self TM code 36, shown in FIGS. 1 and 3A, when the projectile 31 is approximately 9 meters above the ground for this particular mission.

The range processing fuze modulator 30 is disabled by applying a Modulation (MOD) Off signal 44 to input 29 of the self telemetry circuitry 25, and the corresponding self telemetry (TM) code signal 24 is sent to the self TM Code input 40 of the self TM Circuitry 25. The self TM circuitry can include two transistors or semiconductors T1 and T2. T1, using standard procedures in the art can be made to receive the modulation off signal 44 and turn off the fuze modulator 30. T2, using standard procedures can be used to receive the self TM signal 44 and provide the MIMIC 20 modulation signal 26 to the VCO input 25 of the MIMIC 20. Upon completion of the rf code transmission 22, the self TM signal 24 is deactivated and the range processing fuze modulator 30 is reactivated by programmed removal of the MOD Off signal 44 at input 29 of the self telemetry circuitry (STMC) 25.

Under operating conditions the MMIC 20 is mounted in a fuze. When the MMIC 20 is not transmitting self telemetry signals, it is operating as a normal radar proximity fuze. In the normal radar mode, as the fuze approaches a target, some of the energy reflected by the target re-enters the antenna 21 and is directed to a mixer in the MMIC 20 where it is multiplied with RF energy from a Local Oscillator. This process generates an IF signal 28 that is a function of the target distance.

Referring to FIG. 1, a typical artillery mission scenario is shown in which a projectile launched by a launcher 32 containing a self-telemetry system radiates information relating to the events indicated and the status of the warhead to a telemetry (TM) van 50. In FIG. 1 the self-telemetry system operates by using the existing on-board fuze transmitter to send information concerning the status of the fuze and the status of events by modulating the transmitter frequency of the MIMIC 20 transmitter with self TM pulses. The coded pulses are generated by the fuze timer 23 and occur at Specific operating events in the mission sequence. These events can include time zero 33 when the missile is launched, warhead electrical arming 34, fuze ranging system detection of the specified height of burst, or any other event that can be detected and converted to a self TM signal 24. Fuze performance can be immediately evaluated by reviewing the self telemetry signals received by the TM van 50. If there is a circuit malfunction the self TM signals will provide an indication of the reason for failure.

Figure 3B:
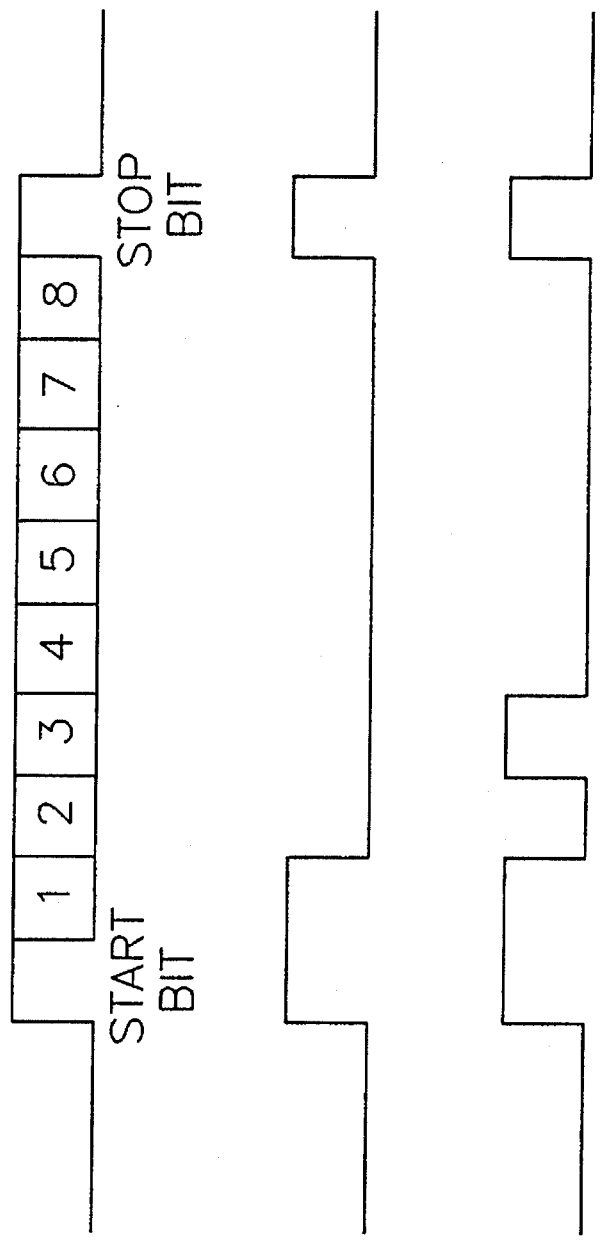

Referring to FIG. 3A and 3B, one sees the pulse train and 8 bit code which is representative of the types of self TM pulsing schemes available for modulation of the transmitter in the MIMIC 20. The pulse train of FIG. 3A offers lower signal bandwidth but higher noise immunity, while the 8 big code of FIG. 3B offers higher bandwidth but reduced noise immunity. Error detection codes such as parity bits or hamming codes can be added for increased noise immunity. The pulse train of FIG. 3A is generated by toggling the self TM input 40 high and low. The base pulse, or "unit pulse" is high for 100 microseconds and low for 200 microseconds. The unit pulse is repeated "n" times to generate the self TM #n pulse train. A 200 microsecond low duration is added at the end of a pulse train as a marker. This end of pulse marker is necesarry to differentiate between consecutive pulse trains, as in FIG. 3A, self TM #2 and #3. The 8 bit code shown in FIG. 3B is the same format as ASCII code. A logic 1 data bit is indicated by a high level, and a logic 0 bit is indicated by a low level. The start and stop bits are always logic 1. The 8 bit code can be repeated multiple times to increase the noise immunity; however, this is done at the expense of the signal bandwidth.

This invention should not be restricted to its disclosed embodiment but rather should be viewed by the intent and scope of the following claims.

What is claimed is:

1. A self-telemetry fuze system comprising:

a radar fuze transmitter, means to measure fuze parameter status, means to encode said fuze parameter status, means to modulate said fuze transmitter with said encoded fuze parameter status wherein said fuze transmitter transmits an encoded signal, a platform based receiving station means to receive said transmitted encoded signal, wherein said means to modulate said fuze transmitter comprises a self telemetry circuit that disables an existing radar fuze modulator and connects an encoded fuze parameter status signal to said fuze transmitter means, wherein said self telemetry circuit comprises a first transistor that receives a modulator off signal from a fuze timer and disables a fuze modulator used in said radar fuze transmitter, and a second transistor that receives an encoded fuze parameter signal and provides an output to said fuze transmitter input.

2. A self TM fuze system as in claim 1 wherein said radar fuze transmitter is a frequency modulator transmitter.

* * * * *